E. L. Bolster,
Blacking Dish and Knife,
No. 65,637. Patented June 11, 1867.
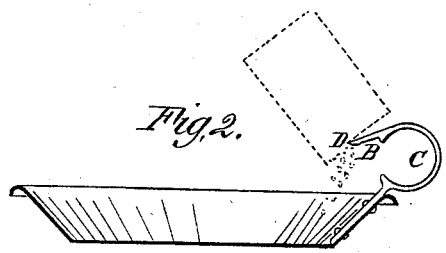
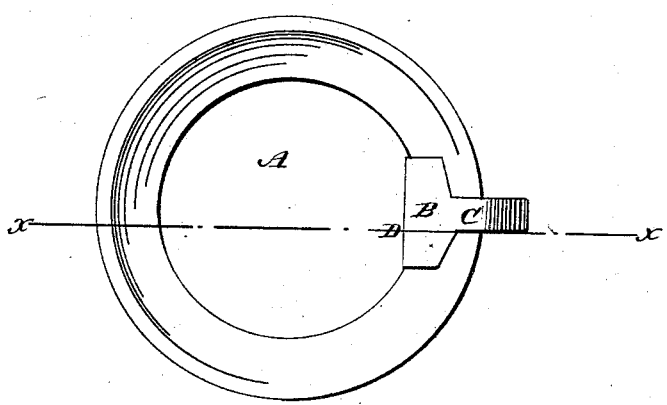
Witnesses.
Theo Tusche.
J. A. Service.
Inventor.
E. L. Bolster.
Per Munn & Co.
Attorneys.

United States Patent Office.

E. L. BOLSTER, OF WATERBURY, CONNECTICUT.

Letters Patent No. 65,637, dated June 11, 1867.

---

IMPROVED BLACKING-DISH AND KNIFE.

---

The Schedule referred to in these Letters Patent and making part of the same.

---

TO ALL WHOM IT MAY CONCERN:

Be it known that I, E. L. BOLSTER, of Waterbury, in the county of New Haven, and State of Connecticut, have invented a new and improved Dish; and I do hereby declare that the following is a full, clear, and exact description thereof, which will enable others skilled in the art to make and use the same, reference being had to the accompanying drawings, forming part of this specification.

The present invention relates to a dish for holding stove-blacking, or polish, more particularly, and the invention consists in combining with the dish a knife or blade that is secured to one side of the same, and in such a position that by drawing the lump or cake of stove-blacking or polish across and over its cutting edge, the blacking, as it is cut thereby, will fall into the dish, wherein by mixing water or other suitable liquid with it, it can be used with a suitable brush, as in the ordinary manner. In the accompanying plate of drawings my improved dish is illustrated—

Figure 1 being a plan or top view of the dish; and

Figure 2 a central vertical section, taken in the plane of the line $x\ x$, fig. 1.

Similar letters of reference indicate like parts.

A, in the drawings, represents the dish, which in the present instance is made of sheet metal, but may be made of any other suitable material. B, a knife or cutter blade, secured to one side of dish A, by and through a curved or bent arm, C, that at its lower end is riveted to the dish, but at its upper end carries the said knife-blade, with its cutting edge D, over the body of the dish. By drawing across or over the cutting edge of the knife B, the lump or cake of stove-blacking or polish, it will be cut thereby, and as it is thus cut will fall into the dish, where, by using water or other suitable liquid, it can be mixed and made ready for being applied to the stove by using the proper brush or brushes. By the curved arm forming the means of connection between the dish and knife-blade, the dish can be conveniently handled, and with it, also while the knife is being used for cutting up the stove-polish, the dish can be held firm and steady.

The advantages of my improved dish are many, among which may be here mentioned that it is simple, convenient, cheap, and most desirable to housekeepers and others.

I claim as new, and desire to secure by Letters Patent—

A dish provided with a knife or cutter blade, substantially as and for the purpose described.

E. L. BOLSTER.

Witnesses:
GEO. E. TERRY,
THOMAS DONOHUE.